B. C. KNUDSEN.
RADIUS ROD FOR AUTOMOBILES.
APPLICATION FILED APR. 17, 1913.
1,221,190.
Patented Apr. 3, 1917.
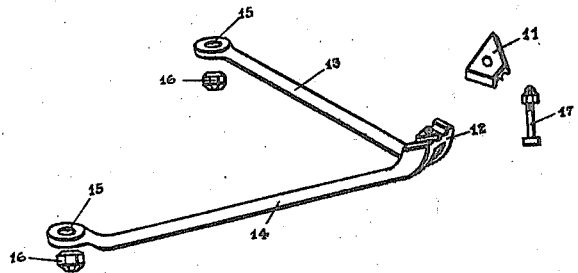
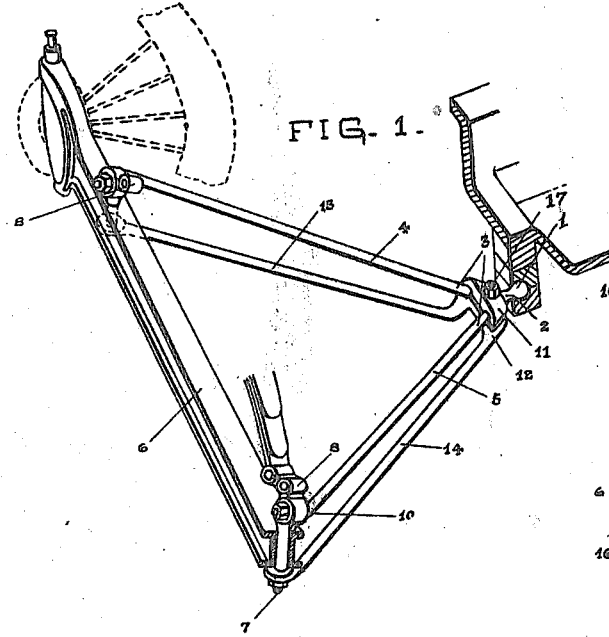
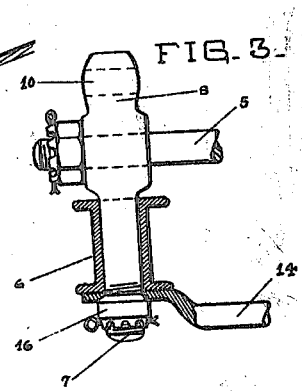
WITNESSES:
P. J. Thorn.
M. G. Mulligan
INVENTOR:
Becker Chr. Knudsen

UNITED STATES PATENT OFFICE.

BECKER CHR. KNUDSEN, OF CLINTON, IOWA.

RADIUS-ROD FOR AUTOMOBILES.

1,221,190.  Specification of Letters Patent.  Patented Apr. 3, 1917.

Application filed April 17, 1913. Serial No. 761,859.

*To all whom it may concern:*

Be it known that I, BECKER CHRISTIAN KNUDSEN, a citizen of the United States, residing at Clinton, in the county of Clinton and State of Iowa, have invented a new and useful Radius-Rod for Automobiles, of which the following is the specification.

My invention relates to radius rods employed to brace and hold in position the front axle of an automobile of the type consisting of two rods meeting and joined together at an angle, at which point an enlargement of globular form is situated and contained in a ball and socket bearing attached to the bottom of the engine and crank case. From this point the radius rods each extend diagonally forward to the front axle at the point where the hanger carrying the end of the front spring is situated. At this point the front end of said radius rod is fastened by being inserted into a hole in said spring hanger and is securely held in place by a nut.

My invention consists in a brace attached to said radius rods at a point between the two extremities and extending to that point on the lower side of said front axle, where the end of the spring hanger in the form of a threaded bolt protrudes through a hole in the axle, the end of said brace rod which is of a shape suitable for the purpose is attached to said lower end of said spring hanger and by means of a nut securely fastened thereto.

The object of my invention is to reinforce and strengthen said front radius rods so that they will resist the violent jars imparted to them on the road, and yet maintain their original shape, thereby successfully serving to keep the front axle in alinement and facilitate safety and the easy steering qualities of the automobile. All illustrated in the accompanying drawing of which—

Figure 1 shows the front radius rods of an automobile and part of the front axle with my brace rods attached.

Fig. 2 represents my brace rods with the clamping device open showing the depressions for receiving the radius rods near their junction. Also the cover 11 and bolt 17 and nuts 16 which fasten it to the frame of the automobile.

Fig. 3 shows the nut with taper seat holding the front end of the lower radius rod to the spring hanger.

Fig. 1 shows my brace rods attached to the radius rods and axle of an automobile. 1 represents the ball extremity of the radius rods as used on an automobile. Attached to the ball is a metallic rod or neck 2 which at once forms a fork 3 by dividing into two diverging radius rods 4 and 5 which at this junction point near the ball meet at an acute angle.

The distal extremity of rods 4 and 5 extend forward and laterally, until they reach the front axle 6 at the point where the bolt 7 of the spring hanger 8, 8 perforates a hole in the front axle.

The shoulder of the spring hanger 8 is perforated by a hole 10 into which the distal end of radius rods 4 and 5 is fastened on each side, and serve to hold the front axle and wheels in alinement. 11 and 12 is the clamp of my brace rods. It consists of a body of metal, formed so as to snugly envelop the fork 3 of the radius rods and is made in two halves held together by means of a bolt and nut 17 and at the same time clamping the fork 3 of said radius rods.

From the lower half 12 of the clamps, extend two rods 13 and 14 forward to the front axle. Each one terminating in a flattened end, in which there is a hole 15 penetrated by the lower end of bolt 7 as it emerges from the lower side of the front axle.

The hole 15 is beveled nearly the entire thickness of the material and a nut 16 with a beveled seat, screws onto the end of bolt 7 holding the bolt 7 as well as the front end of rod 13 and 14 firmly in place.

The brace rods referred to can be made as an integral part of the radius rods in which case the lower rods might be joined to the upper at a point nearer to the front axle and be formed more nearly in the form of a shorter projection or brace extending to the lower part of the front axle. I am aware that radius rods for supporting and holding the front axle of an automobile in position have been constructed in the shape of two rods fastened to the front axle and extending backward under the crank case of the motor, joined together, and terminates in a round ball shaped extremity which is received and held in a socket bearing on the crank case. Therefore, I do not claim radius rods with a ball and socket bearing generally, but I claim:

1. The combination with a V-shaped radius rod for motor vehicles, the crotch of said radius rod having a swivel connection with the transmission case of the motor vehicle and having its legs connected to the top of the front axle, of a sub-radius rod having an attachable and a detachable connection with the crotch of the radius rod and connected to the bottom of said front axle.

2. The combination with a V-shaped radius rod for motor vehicles, the crotch of said radius rod having a swivel connection with the transmission case of the motor vehicle and having its legs connected to the top of the front axle, of a V-shaped sub-radius rod having an attachable and detachable connection with the crotch of the radius rod and having its legs connected to the bottom of said front axle.

3. The combination with a V-shaped radius rod for motor vehicles, the crotch of said radius rod having a swivel connection with the casing of a power motive element of the motor vehicle and having its legs connected to the top of the front axle, of a sub-radius rod having a connection at one end to said radius rod near its crotch and at the other end to said axle.

4. The combination with a V-shaped radius rod for motor vehicles, the crotch of said radius rod having a swivel connection with a fixed part of the motor vehicle and having its legs connected to the top of the front axle, of a V-shaped sub-radius rod connected at one end to said radius rod near its crotch and at its other end to said axle.

Signed at Clinton, in the county of Clinton, and State of Iowa, this first day of April, A. D. 1913.

BECKER CHR. KNUDSEN.

Witnesses:
M. G. MULLIGAN.
J. A. REASE.